United States Patent
Dufresne-Nappert et al.

(10) Patent No.: US 7,259,113 B2
(45) Date of Patent: Aug. 21, 2007

(54) WOVEN SCRIM MATERIAL

(75) Inventors: Sylvain Dufresne-Nappert, Ontario (CA); Steve Valenti, North Bay (CA); Haresh Sachithanandan, Summerville, NC (US)

(73) Assignee: Polymer Group, Inc., Charlotte, NC (US)

( * ) Notice: Subject to any disclaimer, the term of this patent is extended or adjusted under 35 U.S.C. 154(b) by 70 days.

(21) Appl. No.: 11/073,242

(22) Filed: Mar. 3, 2005

(65) Prior Publication Data

US 2005/0239354 A1    Oct. 27, 2005

Related U.S. Application Data

(60) Provisional application No. 60/551,006, filed on Mar. 4, 2004.

(51) Int. Cl.
*D04H 1/00*    (2006.01)
*D03D 15/00*   (2006.01)
*D03D 25/00*   (2006.01)

(52) U.S. Cl. .............. 442/2; 442/33; 442/34; 442/35; 442/36; 442/38; 442/41; 442/49; 442/131; 442/136; 139/383 R; 139/426 R

(58) Field of Classification Search .......... 442/2, 442/33, 34, 35, 36, 38, 41, 49, 131, 136; 139/383 R, 426 R
See application file for complete search history.

(56) References Cited

U.S. PATENT DOCUMENTS 6,367,513 B1    4/2002   Cain
2004/0171318 A1* 9/2004  Rashed .................. 442/33

OTHER PUBLICATIONS

Intertape Polymer Group, "Nova-Shield™ FR/UV Woven Polyolefin Fabric", 4 pages, 2000 (no month), a printout of: http://www.intertapepolymer/NR/rdonlyres/7D60F12C-3651-451C-9533-B740BE8D9C6/0/NovaShld.pdf, Mar. 20, 2007.

* cited by examiner

*Primary Examiner*—Ula C. Ruddock
(74) *Attorney, Agent, or Firm*—Kilyk & Bowersox, P.L.L.C.; Valerie Calloway

(57) ABSTRACT

The present invention is directed to a scrim comprised of a plurality of warp and weft tapes, and more specifically to a woven scrim comprised of warp tapes and weft tapes, wherein the warp tapes are positioned in first and second planes to increase the warp coverage by at least 150% such that the resulting scrim material is impervious to light and further deters bunching of the warp tapes.

5 Claims, 6 Drawing Sheets

WOVEN SCRIM MATERIAL

CROSS-REFERENCE TO RELATED APPLICATION

This application claims the priority of Provisional Application No. 60/551,006, which was filed on Mar. 4, 2004.

TECHNICAL FIELD

The present invention generally relates to a scrim comprised of a plurality of warp and weft tapes, and more specifically to a woven scrim comprised of warp tapes and weft tapes, wherein the warp tapes are positioned in first and second planes to increase the warp coverage by at least 150% such that the resulting scrim material is impervious to light and further deters bunching of the warp tapes.

BACKGROUND OF THE INVENTION

Woven scrims of polyolefin tapes are known in the art and utilized as protective covers or tarpaulins so as to shield various goods from the deleterious effects of the environment, such as rain, snow, and sun. Conventional woven scrim materials comprise a plurality of intersecting warp and weft tapes that inherently create spaces between the tapes that allow for the penetration of light, causing a defect known as "window paning" or "star lighting" to occur. A common solution to this problem is to cover the scrim with an opaque layer of polymer, which is often a blend of carbon black and polyolefin. Such a solution adds to the manufacturing time, as well as the cost of the product. Further, in attempt to deflect light, tapes are often pigmented with dark hues rather than light hues, which are known to not block light as effectively.

Attempts have been made by the prior art to increase the overall strength of woven scrims by stacking tapes or filaments and using alternative weave patterns; however the scrims taught in the prior art fail to address the deleterious effects of sunlight and still allow light to pass through the interstices formed by the warp and weft tapes. In addition, stacking tapes and filaments can result in the tapes bunching or bending affecting the planarity of the scrim. A need remains for a cost efficient, light colored, consistently planar, woven scrim that deters the bunching of tapes and is impervious to light, without requiring the need for additional polyolefin layers.

SUMMARY OF THE INVENTION

The present invention is directed to a scrim comprised of a plurality of warp and weft tapes, and more specifically to a woven scrim comprised of warp tapes and weft tapes, wherein the warp tapes are positioned in first and second planes to increase the warp coverage by at least 150% such that the resulting scrim material is impervious to light and further deters bunching of the warp tapes.

In accordance with the present invention, a scrim material is produced utilizing conventional weave equipment comprising warp tapes orientated parallel to one another and positioned in first and second planes. Further, the first plane of warp tapes are situated in an offset relationship to the warp tapes of the second plane by about 5%-90% of the width of the tapes. Offsetting the warp tapes of the first and second planes increases the warp coverage within the scrim, in addition to preventing light from permeating the scrim.

A plurality of weft tapes intersect the first and second planes of warp tapes, in a repeating pattern of over three warp tapes and under three warp tapes. Due to the offset relationship between the warp tapes positioned in the first and second planes, the three by three weave pattern visually appears as a two by one weave pattern.

The present invention contemplates the use of more than one color tape. In one embodiment, the warp tapes of the first plane are assigned a first color, the warp tapes of the second plane are assigned a second color, and the intersecting weft tapes are assigned a third color. Due to the nature of the offset multi-planar warp tapes, the obverse side of the resultant scrim is characterized by the first color assigned to the first plane of warp tapes and the third color assigned to the weft tapes, while the reverse side characterized by the second color assigned to the second plane of warp tapes and the third color assigned to the intersecting weft tapes.

Other features and advantages of the present invention will become readily apparent from the following detailed description, the accompanying drawings, and the appended claims.

DETAILED DESCRIPTION

Figure 1:
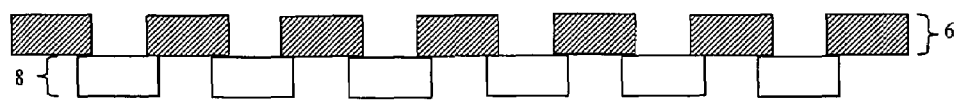
FIG. 1 is a cross-sectional view of the multi-planar warp tapes of the scrim of the present invention.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

Figure 2:
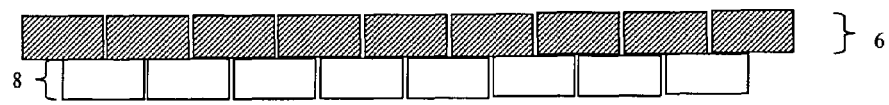
FIG. 2 is an alternate cross-sectional view of the multi-planar warp tapes of the scrim of the present invention.

In accordance with the present invention, a woven scrim comprising multi-planar warp tapes is disclosed; wherein the multi-planar warp tapes are offset in relation to one another as illustrated in FIG. 1. FIG. 1 shows the warp tapes of a first plane 6 and the warp tapes of a second plane 8, whereby the tapes are spaced equidistance from each other. FIG. 2 also illustrates the warp tapes of a first plane 6 and the warp tapes of a second plane 8, whereby once again, the tapes are spaced equidistance from each other; however the number of warp tapes within first plane 6 and second plane 8 has been increased to provide improved warp coverage within the scrim material. Depending on the width of the tapes, the multi-planar warp tapes of the present invention may be offset from one another by 5%-90%. Preferably, the tapes are offset by 15%-75% of the width of the tape, more preferably offset by 25%-65%, and most preferably offset by 40%-50% of the width of the tape. Incorporating multiple planes within the scrim increases the number of warp tapes within the scrim and improves warp coverage of the scrim by 150%-500%, as well as promotes the planarity or flatness of the scrim and deters bunching of the tapes. Further, increased warp coverage prevents "window paning" or "star lighting", which is attributed to light penetrating the scrim. Further still, the increased warp coverage within the scrim enhances the overall strength of the scrim material.

Figure 3:
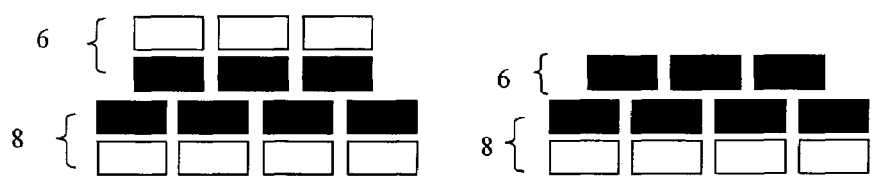
FIG. 3 is an alternate cross-sectional view of the multi-planar warp tapes of the scrim of the present invention.
Figure 4:
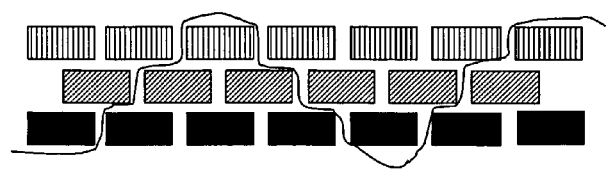
FIG. 4 is an alternate cross-sectional view of the multi-planar warp tapes of the scrim of the present invention.
Figure 5:
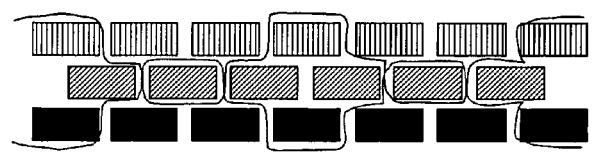
FIG. 5 is a cross-sectional view of the multi-planar warp tapes and intersecting weft tape of the scrim of the present invention.

Upon establishing the multi-planar configuration of the warp tapes, it is in the purview of the invention to utilize compounding tapes within a plane as shown in FIG. 3. FIG. 3 shows a first plane 6 of compounded tapes offset in relationship to a second plane 8 comprised of compound tapes. Optionally and also shown in FIG. 3, only one plane of warp tapes may comprise compound tapes. Further, it has been contemplated that the scrim of the present invention utilizes more than one color tape. As illustrated in FIG. 3, black tapes or dark color tapes may be strategically positioned to face the inside of the scrim, while the outside of the scrim may comprise a light color tape or comprise a natural coating that is imparted on the outside plane to minimize the impact of the dark tapes on the light color coating. Alternately, the warp tapes can be configured into three or more planes, as shown in FIG. 4. In another embodiment, illustrated in FIG. 5, multiple scrims may be interwoven.

Figure 6:
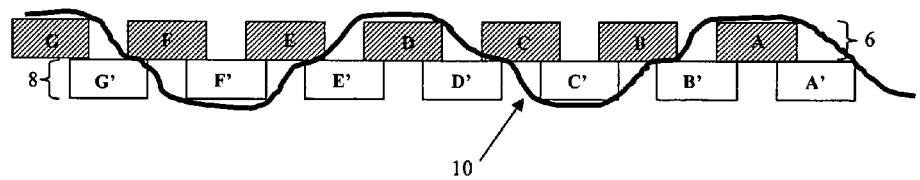
FIG. 6 is a cross-sectional view of the multi-planar warp tapes and intersecting weft tape of the scrim of the present invention.
Figure 7:
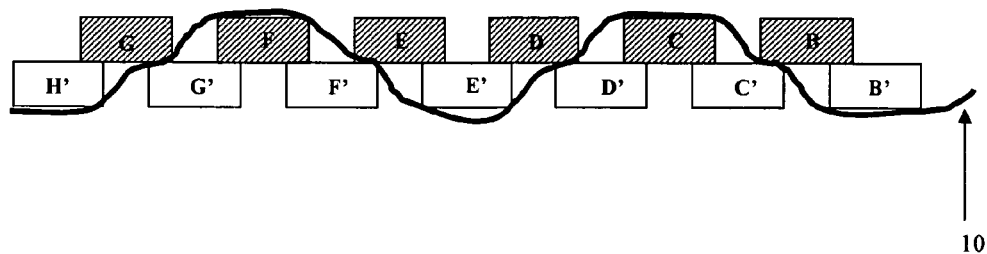
FIG. 7 is a cross-sectional view of the multi-planar warp tapes and intersecting weft tape of the scrim of the present invention.
Figure 8:
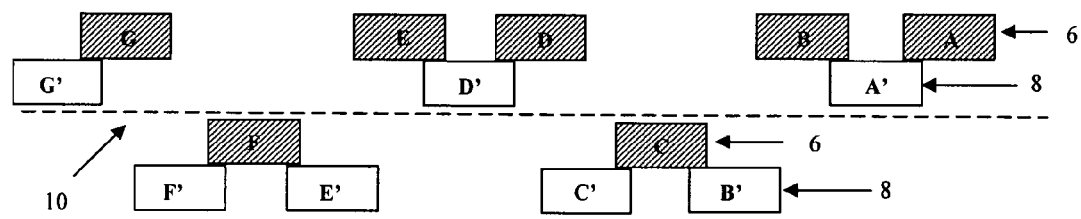
FIG. 8 is also a cross-sectional view of the multi-planar warp tapes and intersecting weft tape of the scrim of the present invention.
Figure 9:
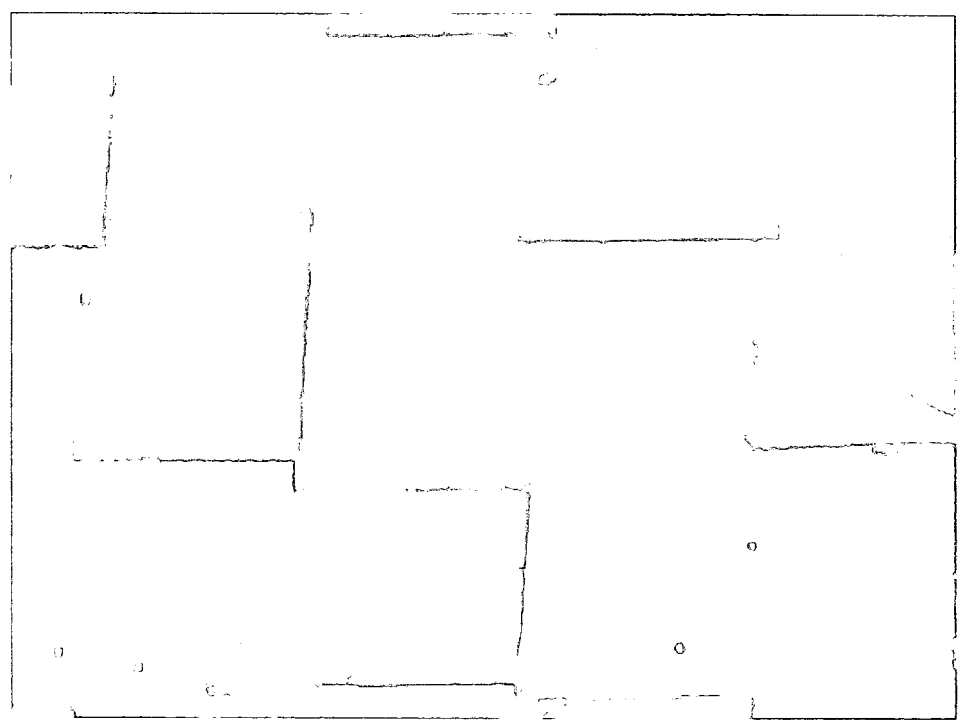
FIG. 9 is a photomicrograph of the obverse side of the scrim of the present invention.
Figure 10:
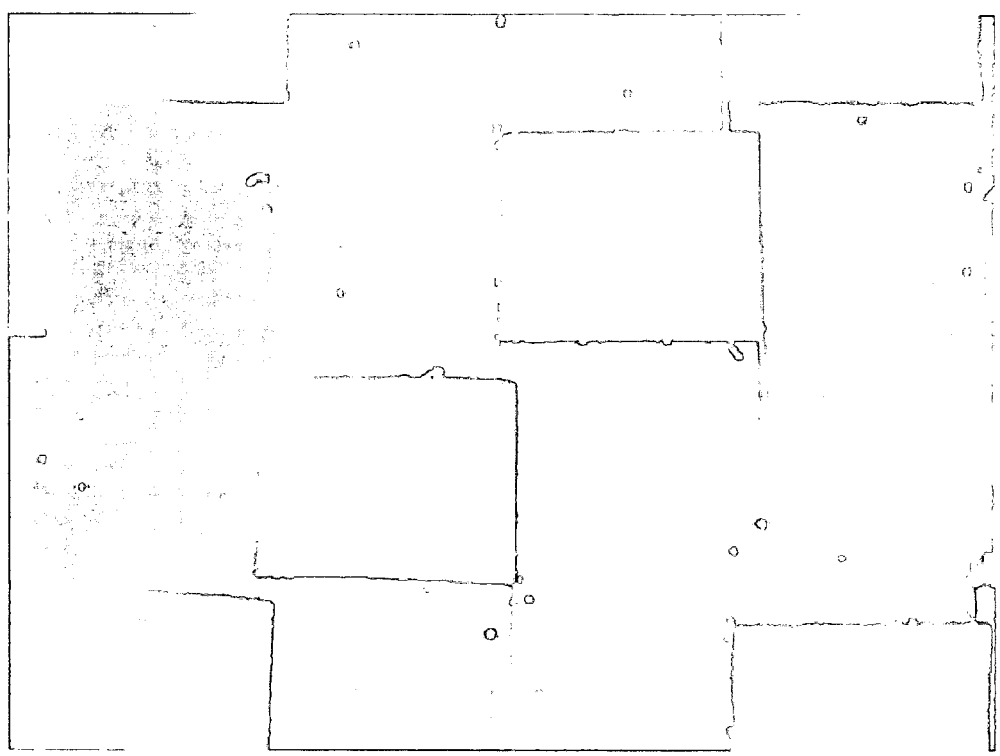
FIG. 10 is a photomicrograph of the reverse side of the scrim of the present invention.
Figure 11:
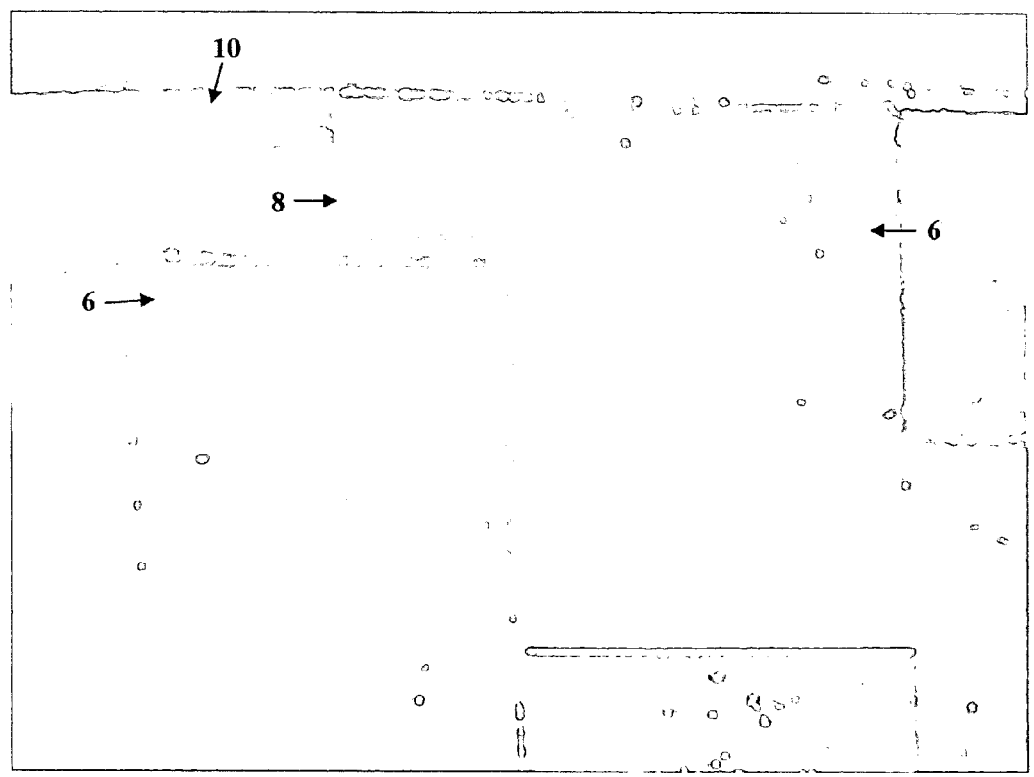
FIG. 11 is a photomicrograph of the multi-planar warp tapes and intersecting weft tape of the reverse side of the scrim of the present invention.

The weft tape moves across the scrim intersecting the warp tapes of both planes. FIGS. 6 and 7 are indicative of how the weft tape 10 intersects perpendicular to the warp tapes of the first plane 6 and second plane 8. As illustrated, the warp tapes of the first and second planes move together and are displaced from one another in sets of three. The weft tape 10 intersects every third warp tape, crossing over three tapes and then crossing under three tapes successively across the multi-planar configuration of the warp tapes as shown in FIG. 8. In an alternate embodiment, the woven scrim may comprise a second weft tape.

The warp and weft tapes of the scrim are of the same width, thickness and composition, however it is in the purview of the present invention that the warp and weft tapes comprise dissimilar dimensions, as well as dissimilar compositions. Suitable compositions for the tapes of the scrim include polyolefins, such as polyethylene, polypropylene, and derivatives thereof, polyesters, polyamides, polyvinyl chloride, and the combinations thereof. The tapes that are utilized are not to be considered a limiting factor of the present invention and may include elastomers, co-polymers, conjugates, as well as one or more cross-sections. Further, the tapes may incorporate one or more performance or aesthetic enhancing melt additives.

It is also in the purview of the present invention that the woven scrim material includes additional layers that are mechanically or chemically adhered to the scrim. Suitable layers include, but are not limited to additional scrims, wovens, nonwovens, and films. The additional layers may be apertured, imaged, printed, or otherwise treated to optimize the end-use application of the woven scrim. Additional permeable or impermeable film layers may be extruded directly onto the scrim of the present invention or unwound and juxtaposed with the scrim to be bonded by various means known to those skilled in the art. Further, woven and nonwoven layers may be mechanically stitched to the scrim or adhered by an adhesive layer.

The surface of the scrim material or the individual tapes may be treated with one or more performance or aesthetic enhancing additives. Additives may be applied by spraying, padding, kiss rolling, or submerging of the scrim material. It has been contemplated that the obverse and reverse sides of the scrim may comprise similar or dissimilar additives. Some suitable additives include UV protectants, various pigments including thermochromic pigments and photochromic pigments, pesticides, fungicides, algaecides, repellants, and a combination thereof.

The woven scrim material of the present invention may be used as a lining or tarpaulin, otherwise called a "tarp", in various industries, such as waste management, recycling, and landfill industries, as well as farming, landscaping, and transportation industries, to provide protection from the elements of the environment. The scrim may further include clips or ties about the perimeter to affix the scrim in a stationary position. Further, the scrim material may be utilized as a recreational cover, such as a swimming pool cover, picnic table shelter, or tent material. It may optionally be camouflage printed or otherwise printed for recreational or military use. Further still, the scrim material may be used as a component within various non-floating and floating cover systems, such as lagoon and manure pit covers.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A woven scrim comprising a plurality of warp tapes oriented parallel to one another, arranged in a first plane and a second plane, wherein said first plane is offset from said second plane, and a plurality of weft tapes that intersect perpendicular to said first and second planes of said warp tapes; said weft tapes intersect every third warp tape, crossing over three tapes and then crossing under three tapes successively across the scrim, wherein said first plane of warp tapes and said second plane of warp tapes are offset from each other by at least 5% based on a width of the tapes.

2. A woven scrim as in claim 1 wherein the first plane of warp tapes are situated in an offset relationship to the warp tapes of the second plane by about 5%-90% based on a width of the tapes.

3. A woven scrim as in claim 1 wherein the first plane of warp tapes are situated in an offset relationship to the warp tapes of the second plane by about 15%-75% based on a width of the tapes.

4. A woven scrim as in claim 1 wherein the first plane of warp tapes are situated in an offset relationship to the warp tapes of the second plane by about 26%-65% based on a width of the tapes.

5. A woven scrim as in claim 1, wherein the first plane of warp tapes are situated in an offset relationship to the warp tapes of the second plane by about 40%-50% based on a width of the tapes.

* * * * *